(12) United States Patent
Ferrari

(10) Patent No.: US 10,979,104 B1
(45) Date of Patent: Apr. 13, 2021

(54) DIVERSE EAVESDROPPING FOR A HEARING DEVICE

(71) Applicant: Sonova AG

(72) Inventor: Federico Ferrari, Bern (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/739,153

(22) Filed: Jan. 10, 2020

(51) Int. Cl.
*H04W 76/10* (2018.01)
*H04B 7/026* (2017.01)
*H04W 4/80* (2018.01)
*H04M 1/60* (2006.01)
*H04L 29/06* (2006.01)

(52) U.S. Cl.
CPC ........... *H04B 7/026* (2013.01); *H04L 65/608* (2013.01); *H04M 1/6066* (2013.01); *H04W 4/80* (2018.02); *H04M 2250/02* (2013.01)

(58) Field of Classification Search
CPC ........ H04W 4/80; H04W 84/12; H04R 5/033; H04R 1/1016
See application file for complete search history.

(56) References Cited

U.S. PATENT DOCUMENTS

| 10,341,758 | B1 * | 7/2019 | Tong | H04W 80/02 |
| 2009/0034498 | A1 * | 2/2009 | Banerjea | H04W 76/15 370/338 |
| 2019/0044576 | A1 | 2/2019 | Thoen et al. | |
| 2020/0220655 | A1 * | 7/2020 | Agarwal | H04L 1/1621 |

* cited by examiner

*Primary Examiner* — Tu X Nguyen

(57) ABSTRACT

The disclosed technology generally relates to wireless communication. More specifically, the disclosed technology relates to activating and suspending diversity in transmission and reception of packets for hearing devices that are streaming audio information from a wireless communication device. For example, when a first hearing device is waiting for an acknowledgment of a signaling packet, the disclosed technology can suspend the transmission of acknowledgement packets in response to correctly received audio packets by a second hearing device until the first hearing device has successfully received an acknowledgment of the signaling packet. The disclosed technology also includes a policy that ensures correct sequence numbers are used in a packet header after diversity is resumed.

22 Claims, 6 Drawing Sheets

DIVERSE EAVESDROPPING FOR A HEARING DEVICE

TECHNICAL FIELD

The disclosed technology generally relates to wireless communication. More specifically, the disclosed technology relates to activating and suspending diversity in transmission and reception of packets for hearing devices that are streaming information from a wireless communication device.

BACKGROUND

A hearing device can stream audio from an audio source using an Advanced Audio Distribution Profile (A2DP). For example, a hearing device can use Bluetooth Basic Rate/Enhanced Data Rate™ (Bluetooth BR/EDR™) to stream music from a smartphone configured to transmit audio using A2DP.

Because Bluetooth BR/EDR™ is generally a point-to-point communication, it may be necessary for one of two hearing devices worn by a user to eavesdrop an audio stream to hear audio in stereo while the other hearing device maintains a point-to-point Bluetooth BR/EDR™ connection. Specifically, a primary hearing device may establish a wireless connection with an audio source and begin streaming music, and a secondary audio device can eavesdrop the audio stream (e.g., without a wireless connection to the audio source). The primary hearing device can receive audio packets for the left stereo channel and the secondary hearing device can eavesdrop audio packets for the right stereo channel (or vice versa). Accordingly, A2DP eavesdropping allows the hearing device user to listen to an audio stream in stereo despite Bluetooth BR/EDR™ being a point-to-point connection.

To provide a reliable audio stereo stream experience for a hearing device user, an audio source should quickly receive an acknowledgment; otherwise, it cannot proceed with transmission of a next audio packet and a level of an audio buffer of the hearing device begins to decrease, which may cause annoying interruptions for the hearing device user if the buffer is empty. Yet, receiving an acknowledgment quickly is not always possible for at least a few reasons.

For example, in the 2.4 GHz Industrial, Scientific, and Medical (ISM) band, wirelessly transmitting information from an audio source to a hearing device can include errors and/or signal degradations because of body shadowing. Body shadowing refers to the interference of a body part with the transmission or reception of packets. Depending on the position of the hearing devices and an audio source, wireless communication can be difficult. For example, a person's head can block the reception or transmission of an acknowledgment packet. Additionally, body movements can further exacerbate the body shadowing problem. Other technologies in the ISM band such as Bluetooth Low Energy™, Wi-Fi™, and ZigBee™ experience similar errors and/or signal degradation due to body shadowing.

Also, due to stringent size and battery life requirements, hearing devices typically radiate wireless signals with a significantly smaller strength than typical audio sources (e.g., a smartphone). This power asymmetry may result in situations where (at least one of) a pair of hearing devices correctly receives audio packets but the audio source fails to receive acknowledgments.

Accordingly, a need exists to address at least the above identified problems and provide additional benefits. Specifically, a need exists for a system, method, software, or hearing device that is capable of improving wireless communication between a wireless communication device and hearing devices.

Figure 1C:
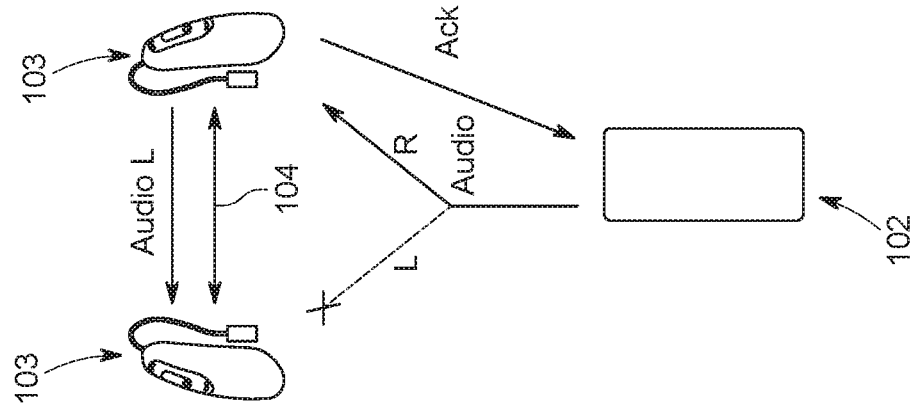
FIGS. 1A, 1B, and 1C illustrate two hearing devices and a wireless communication device configured to implement a diversity scheme in accordance with some implementations of the disclosed technology.

The drawings are not to scale. Some components or operations may be separated into different blocks or combined into a single block for the purposes of discussion of some of the disclosed technology. The disclosed technology is not limited the selected implementations described in the Figures. On the contrary, the disclosed technology is intended to cover all modifications, equivalents, and alternatives falling within the scope of the disclosed technology as defined by the appended claims.

DETAILED DESCRIPTION

The disclosed technology relates to activating and suspending diversity in transmission and reception of packets for hearing devices that are streaming audio information from a wireless communication device (also referred to as an "audio source" if it is transmitting audio information). More specifically, the disclosed technology suspends a secondary hearing device from transmitting acknowledgment packets associated with successfully receiving an audio packet until a primary hearing device receives an acknowledgment from a wireless communication device that its signaling packet was correctly received.

As a preliminary operation to begin streaming stereo audio, a hearing device can establish two wireless connections. First, a hearing device can establish a wireless connection with a wireless communication device based on a first wireless communication protocol. For example, a hearing device can use Bluetooth BR/EDR™ to establish a wireless connection with a wireless communication device after a pairing and/or an authentication operation. The wireless communication device can be considered the audio source because it can transmit an audio stream to a device (e.g., a hearing device). Second, the hearing device can establish a binaural link with a secondary hearing device worn on another ear. Using the binaural link, the hearing devices can implement a second wireless communication protocol to communicate information between the hearing devices (e.g., a proprietary wireless protocol for communicating between hearing aids).

The hearing device maintaining a wireless connection with the wireless communication device can be considered the primary hearing device and the second hearing device can be considered the secondary hearing device because the secondary hearing device can eavesdrop information communicated between the wireless communication device and the primary hearing device. Also, the secondary hearing device can receive other information (e.g., missed packet information or timing information) from the primary hearing device via the binaural link.

When the wireless communication device streams audio information to the primary hearing device, the primary and secondary hearing device can implement a diversity scheme. A diversity scheme enables both the primary and secondary hearing device to transmit or receive acknowledgment (ACK) packets and/or forward packets from one hearing device to another. For example, when implementing a diversity scheme, a primary hearing device can transmit an ACK packet that indicates it successfully received an audio packet or a signaling packet from a wireless communication device or, alternatively, a secondary hearing device can transmit the ACK packet that it successfully received an audio packet. The primary and the secondary hearing device can communicate using the binaural link to determine which hearing device should send ACK packets or it can be determined by a policy (e.g., timing) in the diversity scheme. The diversity scheme can ensure that only a single hearing device (not both) transmits an ACK packet or transmits signaling packets.

Also, the disclosed technology causes the secondary hearing device to not acknowledge correctly received audio packets while the primary hearing device is waiting for an ACK for a previously transmitted signaling packet (even if the first hearing device or second hearing device correctly received the audio packets). This is generally referred to as suspending diversity or at least partially suspending it because it prohibits at least one operation in the diversity scheme (e.g., the second hearing device transmitting acknowledgments). For example, if wireless communication device is streaming audio to a primary hearing device and the secondary hearing device is eavesdropping the audio stream, and the two hearing devices are implementing a diversity scheme, the secondary hearing device will not transmit ACK packets in response to correctly received audio packets until the primary hearing device determines its ACK packet of signaling packet has been correctly received by the wireless communication device. More generally, the secondary hearing device suspends its diversity scheme while the primary hearing device is waiting for an ACK packet of signaling packet it has previously transmitted.

Also, as part of diversity suspension, the secondary hearing device ignores or never acknowledges a correctly received signaling packet from the wireless communication device. Rather, the primary hearing device is the only device that transmits a response to the signaling packet from the wireless communication device after the primary hearing device has correctly received the signaling packet from the wireless communication device. This can reduce requiring binaural forwarding of signaling packets from the secondary hearing device to the primary hearing device, which can be considered a complex operation.

The disclosed technology solves at least the technical problem of increasing the probability that an ACK packet is correctly received. Also, the diversity scheme with suspension capability enables the hearing devices to function well without significantly modifying or changing the Bluetooth stack or configuration of the devices. In some implementations, the disclosed technology also reduces interruptions, signal distortions, and signaling traffic because less bandwidth is used and wireless connections with better connectivity are used.

Figure 1B:
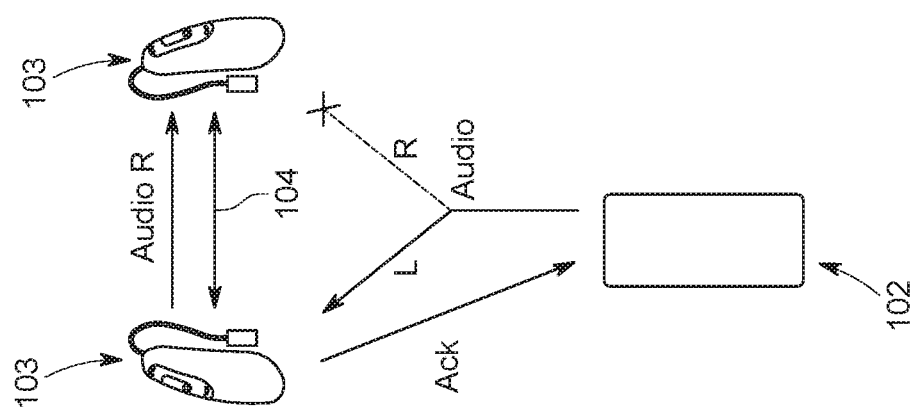
Figure 1A:
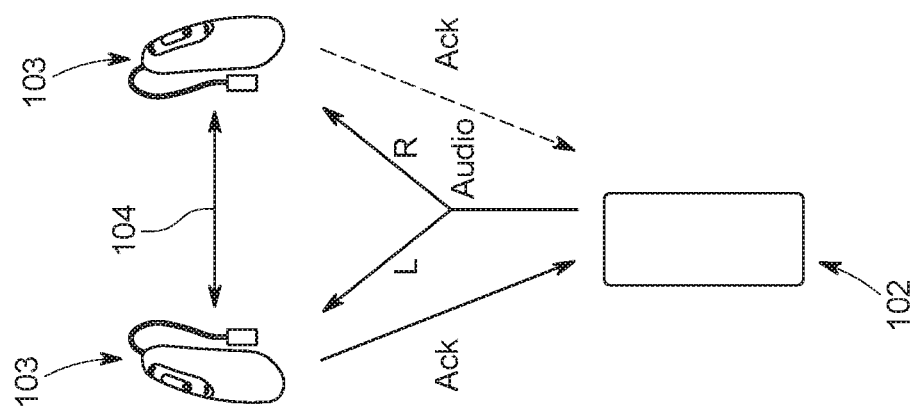

FIGS. 1A, 1B, and 1C illustrate two hearing devices and a wireless communication device configured to implement a diversity scheme and adjust that diversity scheme (e.g., suspend or partially suspend it). As shown by double-headed bold arrows in FIG. 1, the wireless communication devices 102 and the hearing devices 103 can communicate wirelessly, e.g., each wireless communication device 102 can communicate with each hearing device and each hearing device can communicate with the other hearing device. Wireless communication can include using a wireless communication protocol such as Bluetooth BR/EDR™, Bluetooth Low Energy™, a proprietary communication (e.g., binaural communication protocol between hearing aids or bimodal communication protocol between a hearing aid and hearing device), ZigBee™, Wi-Fi™, or an Industry of Electrical and Electronic Engineers (IEEE) wireless communication standard (e.g., 802.11).

A diversity scheme generally enables hearing devices receiving audio and signaling packet to vary or change how they transmit or receive ACK packets. With a diversity scheme, hearing devices can avoid audio interruptions because at least one hearing device should receive an audio packet correctly and transmit an ACK packet to the wireless communication device 102. Also, because the hearing device 103 that correctly receives the audio or signaling packet transmits an ACK packet in a diversity scheme, it increases probability that the wireless communication device receives the corresponding acknowledgment packet because it is likely there is a good connection and/or signaling path between the wireless communication device and the hearing device. FIGS. 1A, 1B, and 1C illustrate different aspects of implementing a diversity scheme with two hearing devices and a wireless communication device.

In FIG. 1A, each hearing device 103 can transmit an ACK packet. An ACK packet is a signal that is transmitted between the hearing device 103 and the wireless communication device 102 that acknowledges reception of a packet of information (e.g., as part of Bluetooth BR/EDR™). The ACK packet can be part of a packet header (see FIG. 3). Specifically, a hearing device 103 can transmit an ACK packet that indicates it received an audio packet or signaling packet correctly from the wireless communication device 102. For example, a primary hearing device wirelessly linked to the wireless communication device can transmit an ACK packet or a secondary hearing device eavesdrops a stream and transmits an ACK packet. If the wireless communication device 102 receives the ACK packet, it can use this information to transmit new (e.g., the next packet) information or continue to stream more information.

In contrast to FIG. 1A where both hearing devices 103 can transmit ACK packets in response to successfully receiving an audio packet, in FIG. 1B, only the primary hearing device 103 successfully receives an audio packet and transmits an ACK packet. Here, the primary hearing device 103 transmits or forwards received audio packet information to the secondary hearing device 103. Specifically, as shown in FIG. 1B, the primary hearing device 103 (left) forwards a "audio R" packet to the secondary hearing device 103 (right hearing device) using a wireless connection 104 (also referred to as a binaural link between two hearing devices). The secondary hearing device 103 does not transmit an ACK packet.

In contrast to FIG. 1B where only the primary hearing device 103 successfully receives an audio packet from the wireless communication device 102, in FIG. 1C, only the secondary hearing device 103 successfully receives an audio packet from the wireless communication device 102 and transmits an ACK packet to the wireless communication device 102. The secondary hearing device also forwards an "audio L" packet to the primary hearing device 103 using the wireless connection 104.

The wireless communication devices 102 are computing devices that are configured to wirelessly communicate. Wireless communication includes wirelessly transmitting information, wirelessly receiving information, or both. The wireless communication devices 102 shown in FIG. 1 include computers (e.g., desktop or laptop), televisions (TVs) or components in communication with television (e.g., TV streamer), a car audio system or circuitry within the car, a mobile device (e.g., smartphone), tablet, remote control, an accessory electronic device, a wireless speaker, or watch. It should be noted that the hearing device 103 is also a wireless communication device 102, but the hearing device 103 is configured to provide audio to a user in addition to wirelessly communicating with other devices.

Some example hearing devices 103 include hearing aids, headphones, earphones, assistive listening devices, or any combination thereof. Hearing devices include both prescription devices and non-prescription devices configured to be worn on or near a human head. As an example of a hearing device 103, a hearing aid is a device that provides amplification, attenuation, or frequency modification of audio signals to compensate for hearing loss or difficulty. Some example hearing aids include a Behind-the-Ear (BTE), Receiver-in-the-Canal (RIC), In-the-Ear (ITE), Completely-in-the-Canal (CIC), or Invisible-in-the-Canal (IIC) hearing aid or a cochlear implant (where a cochlear implant includes a device part and an implant part).

Figure 2:
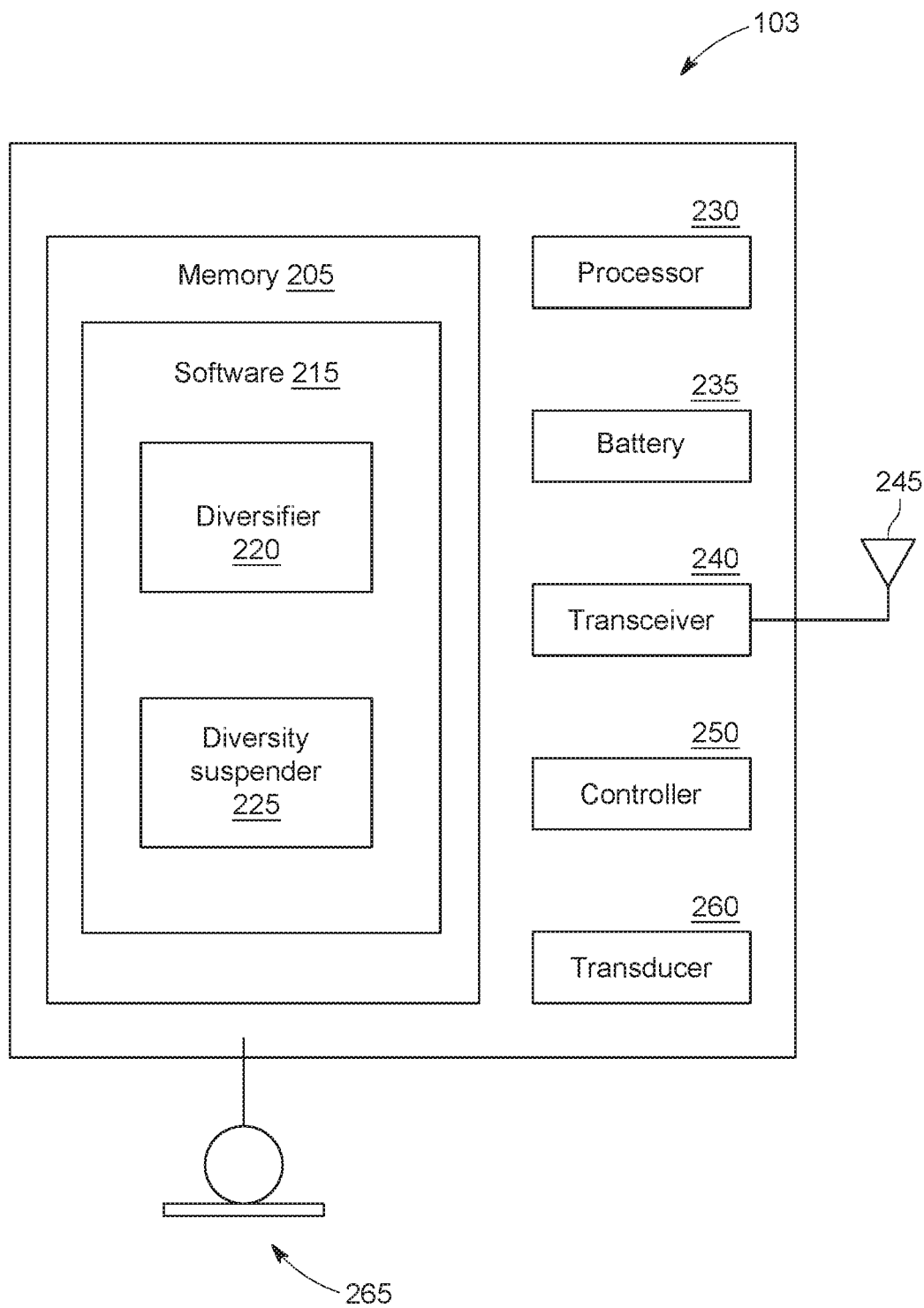
FIG. 2 illustrates a hearing device from FIGS. 1A, 1B, and 1C in more detail in accordance with some implementations of the disclosed technology.

FIG. 2 is a block diagram illustrating the hearing device 103 from FIG. 1 in more detail. FIG. 2 illustrates the hearing device 103 with a memory 205, software 215 stored in the memory 205, the software 215 includes a diversifier 220 and a diversity suspender 225. The hearing device 103 also includes a processor 230, a battery 235, a transceiver 240, an antenna 245, a controller 250, transducer 260, and a microphone 265. Although FIG. 2 shows the hearing device 103 with components for processing or providing sound, the device in FIG. 2 can include additional components such as a global positioning system (GPS) chip or sensor.

The memory 205 stores instructions for executing the software 215 comprised of one or more modules and data utilized by the modules. The modules perform certain methods or functions for the hearing device 103 and can include components, subcomponents, or other logical entities that assist with or enable the performance of these methods or functions. For example, the modules can store algorithms for carrying out a wireless communication protocol that includes transmitting and receiving information, activating diversity, or suspending diversity. Although a single memory 205 is shown in FIG. 2, the hearing device 103 can have multiple memories 205 that are partitioned or separated, where each memory can store different information.

The diversifier 220 implements diversity in reception and transmission of packets. Specifically, the diversifier 220 can implement diversity in transmission of ACK packets in response to receiving audio packets or signaling packets. The diversifier 220 can determine that at least one hearing device has received an audio packet successfully, and then diversifier 220 can determine which hearing device should transmit an acknowledgement of the successfully transmitted audio packet.

In some implementations, the diversifier 220 determines that the hearing device has not received an audio packet and determines to wait for the missed audio packet from another hearing device (e.g., the primary hearing device). Alternatively, the diversifier 220 determines that it has successfully received an audio packet (e.g., a left and right audio packet for stereo sound), and it forwards that received audio packet to another hearing device if that hearing device did not successfully receive it.

Also, the diversifier 220 can determine whether to send an ACK packet. For example, because two hearing devices can transmit an ACK (e.g., the primary or the secondary), the diversifier 220 can determine that only the first hearing device, only the second hearing device, or only the device that the receives the audio packet should transmit an ACK packet. More generally, the diversifier 220 can implement anyone of the schemes described in FIGS. 1A, 1B, and 1C.

The diversity suspender 225 can suspend or limit diversity for the hearing device. The diversity suspender 225 can communicate with the diversifier 220, e.g., to receive an indication that a diversity scheme is being implemented or will soon be implemented (e.g., a request to stream audio has been received). In some implementations, the diversity suspender 225 instructs the hearing device to not transmit ACK packets in response to receiving a signaling packet or audio packet. For example, if a hearing device is the secondary hearing device, the diversity suspender 225 can determine that the secondary hearing device will not transmit ACK packets in response to receiving audio packets and/or signaling packets. The diversity suspender 225 can implement its control based on notifications from the wireless communication device or from the first hearing device or even based on timing information.

The processor 230 can include special-purpose hardware such as application specific integrated circuits (ASICs), programmable logic devices (PLDs), field-programmable gate arrays (FPGAs), programmable circuitry (e.g., one or more microprocessors microcontrollers), Digital Signal Processor (DSP), appropriately programmed with software and/or computer code, or a combination of special purpose hardware and programmable circuitry.

Also, although the processor 230 is shown as a separate unit in FIG. 2, the processor 230 can be on a single chip with the transceiver 240, the controller 250, and the memory 205. The processor 230 can also include a DSP configured to modify audio signals based on hearing loss or hearing programs stored in the memory 205. In some implementations, the hearing device 103 can have multiple processors, where the multiple processors can be physically coupled to the hearing device 103 and configured to communicate with each other.

The battery 235 can be a rechargeable battery (e.g., lithium ion battery) or a non-rechargeable battery (e.g., Zinc-Air) and the battery 235 can provide electrical power to the hearing device 103 or its components.

The controller 250 controls transmission or reception of packets based on requests from requests from the hearing device 103 (e.g., from the processor 230 according to a wireless communication protocol such as Bluetooth BR/EDR™). The controller 250 can be implemented in hardware (e.g., part of the processor 230 or be a separate unit), software (e.g., part of software 215), or a combination of software and hardware. The controller 250 can be configured to communicate with the transceiver 240 to transmit or receive packets such as audio packets or signaling packets.

The antenna 245 is configured to operate in unlicensed bands such as ISM using a frequency of 2.4 GHz (or near 2.4 GHz). The antenna 245 can be configured to operate in other frequency bands such as 5 GHz, 5 MHz, 10 MHz, or other unlicensed bands. The antenna 245 can be configured to implement transmission and reception of information according to any Bluetooth™ standard, ZigBee™, or wireless communication standard for hearing devices.

The transducer 260 is configured to provide audio signals to the hearing device user. For example, the transducer can be a loudspeaker or a transducer for a cochlear device configured to transmit or convert audio signals into nerve stimulation or electrical signals. The transducer 260 can be physically coupled to the hearing device 103. In some implementations, the transducer 260 is connectable to a wire such that the transducer 260 can be inserted into the hearing device user's ear (e.g., for a RIC hearing aid).

The microphone 265 is configured to capture sound and provide an audio signal of the captured sound to the processor 230. The processor 230 can modify the sound (e.g., in a DSP) and provide the modified sound to a user of the hearing device 103. Although a single microphone 265 is shown in FIG. 2, the hearing device 103 can have more than one microphone. For example, the hearing device 103 can have an inner microphone, which is positioned near or in an ear canal, and an outer microphone, which is positioned on the outside of an ear. As another example, the hearing device 103 can have two microphones, and the hearing device 103 can use both microphones to perform beam forming operations. In such an example, the processor 230 would include a DSP configured to perform beam forming operations.

Figure 3:
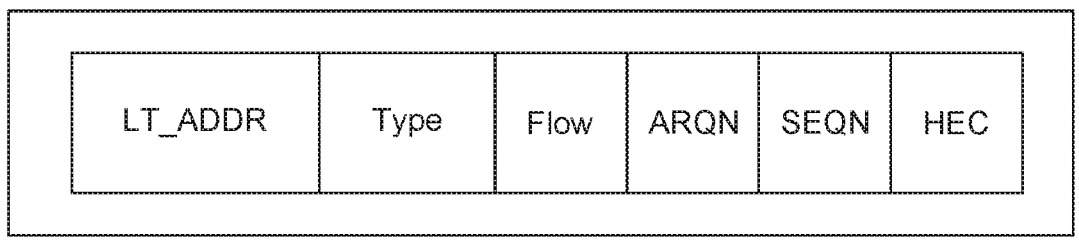
FIG. 3 illustrates a schematic diagram of a packet header used in a wireless communication protocol in accordance with some implementations of the disclosed technology.

FIG. 3 illustrates a schematic diagram for a signaling packet header used in a wireless communication protocol (e.g., Bluetooth BR/EDR™). The packet header can be used in signaling communication. For example, signaling communication occurs during A2DP communication between a wireless communication device and a hearing device (e.g., bidirectional). Two levels of signaling are common: (1) Link Manager Protocol (LMP) communication and (2) Logical Link Control and Adaptation Protocol (L2CAP). LMP generally refers to updated channel maps, periodic channel classification packets, requests to increase or decrease transmit power. L2CAP signaling generally refers to signaling for A2DP (e.g., play or pause stream) or notification (e.g., phone call notifications in Hands-Free-Profile). As A2DP audio packets are also transmitted using L2CAP, the destination Channel ID (CID) field within the L2CAP packet informs whether an L2CAP packet carries A2DP audio or signaling. For example, an L2CAP packet contains A2DP audio and does not signal if the content of its CID field corresponds to the destination channel endpoint that has been configured for A2DP audio packets when the A2DP connection has been established.

Two fields of the header can be used for traffic control in either direction of Bluetooth BR/EDR™. One field is an automatic repeat request number (ARQN) bit in the header packet, which a device can use to acknowledge reception of a valid packet with data from another device by setting the ARQN. This ARQN field can be a "not acknowledge" (NAK), which means that no acknowledgment is being sent, or ACK, which means that an acknowledgment is being sent. A device receiving a header can use the ARQN information to determine whether a packet was received successfully (e.g., based on receiving an "1" in the ARQN field) or whether an acknowledgment was not necessary or the packet was not received correctly.

Another field for signaling traffic in the header is the sequence number (SEQN), which is generally a 1-bit number that is toggled for consecutive packets that carry a payload. For example, an audio packet can be sent as "0" SEQN meaning it is a first packet and then another audio packet can be sent as a "1" SEQN because it is the next packet with payload. A device receiving packets with this header can use the SEQN number to filter out duplicates. For example, if a hearing device correctly receives two consecutive packets that have a "0" for SEQN, it can determine that the second packet is a duplicate of the first one and discard it.

When interpreting a packet header in A2DP, a hearing device may need to use the same SEQN number for transmitting a packet until an acknowledgment is received from a wireless communication device (e.g., audio source). Also, the same SEQN number may need to be used in the communication to the wireless communication device even after reception of an ACK packet and may need to be used for other communications. Accordingly, the SEQN being updated ensures correct wireless protocol functionality. Without an updated or accurate SEQN number, a hearing device user may experience suboptimal performance such as unexpected disconnections because the wireless communication device may filter out correctly received packets if the received SEQN number is not correct or updated.

Also as part of the signaling packet header, the Header Error Check (HEC) is an 8-bit number that is an integrity check value calculated from other bits of the header. The header also includes other information such as Logical Transport Active Member Address (LT_ADDR), which refers to the address of the active slave to which the packet is directed or from which it is being sent. An address of zero is reserved for a "broadcast message" message to all active slave devices. Flow control (FLOW) relates to flow control over the ACL (asynchronous connection-less) logical transport (e.g., 0=stop and 1=go) and type code (TYPE) identifies the type of packet, which depends on whether the logical transport is ACL and SCO (synchronous Connection Oriented). A device receiving the packet header information can use it to update, control, or monitor traffic signaling wireless communications. A device can also generate a packet header when transmitting a packet (e.g., signaling or audio packet).

Figure 4A:
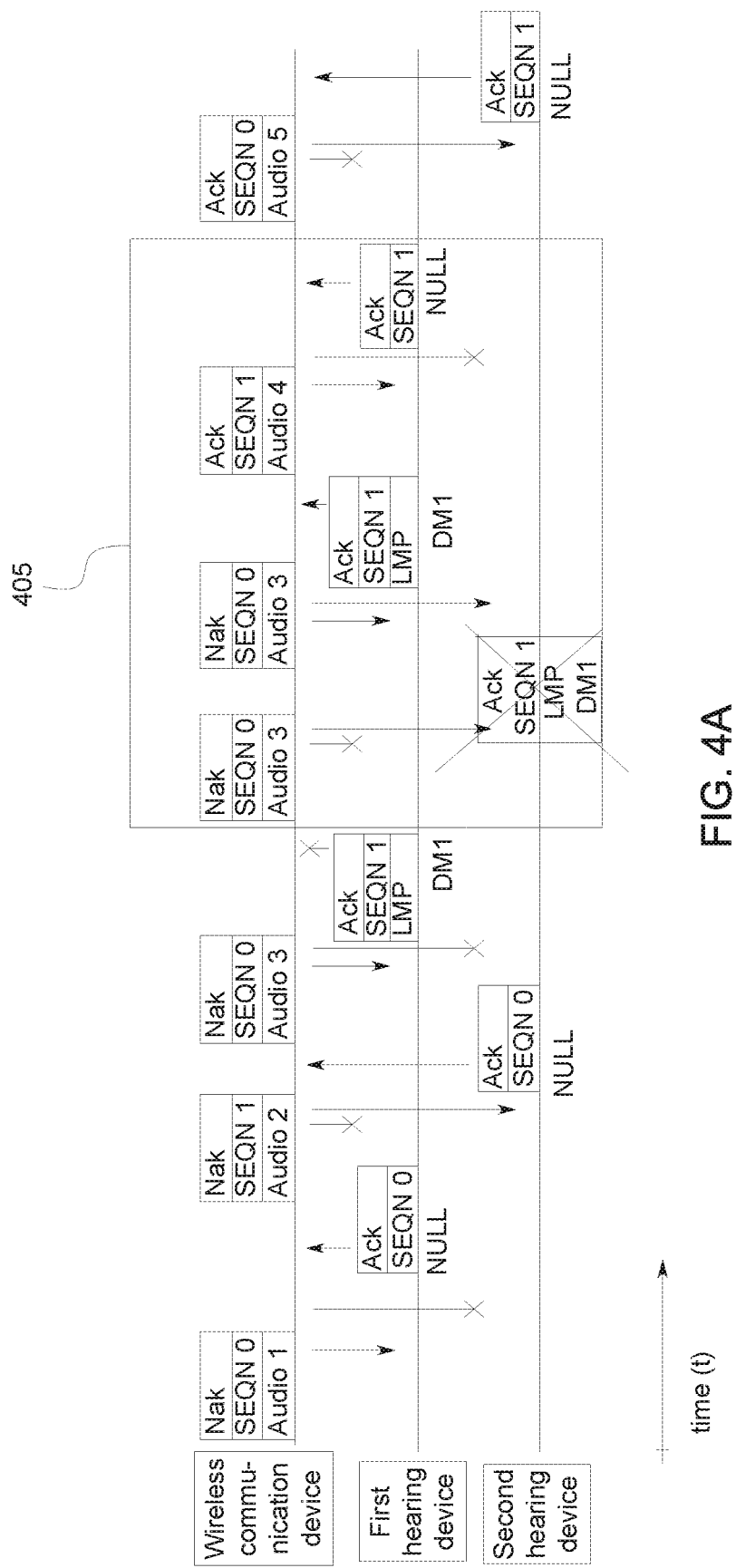
FIGS. 4A and 4B illustrate schematic diagrams for suspending diversity in accordance with some implementations of the disclosed technology.
Figure 4B:
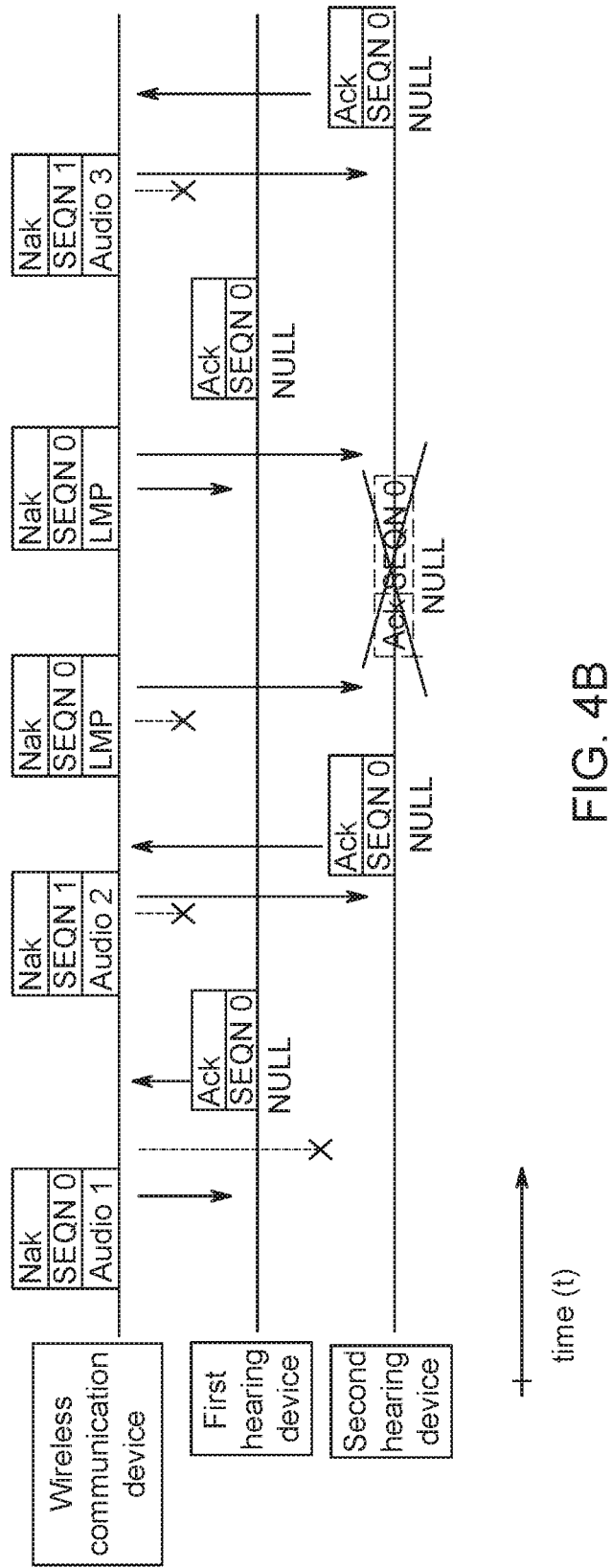

FIGS. 4A and 4B illustrate schematic diagrams for suspending diversity during an audio stream. As shown in FIG. 4A, a wireless communication device (e.g., wireless communication device 102, FIG. 1), a first hearing device (e.g., hearing device 103, FIG. 1), and a second hearing device (e.g., FIG. 1) are streaming audio information. The schematic diagram illustrates what happens as time proceeds from left to right in FIG. 4A.

From the left of FIG. 4A, the wireless communication device transmits an audio packet <NAK; 0; Audio 1>, where "NAK" means negative acknowledgment, either because the last reception attempt failed or an empty packet was received, 0 refers to the SEQN number, and Audio 1 indicates a payload, which can be a left or right or both channels for a stereo stream or the single channel for a mono stream. As shown by the arrow, the first hearing device receives this audio packet ("Audio 1") and transmits an acknowledgment to the wireless communication device. The acknowledgment is an ACK packet <ACK; 0> of type NULL, where "NULL" indicates the packet does not have a payload; rather is just an acknowledgment. However, as shown by the "X" and the dashed lined, the second hearing device does not receive the Audio 1 audio packet (e.g., because of body shadow, disruption, or interruption). In such a case, the first hearing device can forward the Audio 1 packet to the second hearing device as part of a diversity scheme. For example, the first hearing device can forward the right or left audio packet to the second hearing device for stereo audio depending on if the second hearing device is a right or left hearing device. See, e.g., FIGS. 1A, 1B, and 1C for implementing a diversity scheme.

Moving from right to left on FIG. 4A, the wireless communication device transmits another audio packet <NAK; 1; Audio 2>. The first hearing device does not receive the other audio packet as shown by the "X" and dashed line. Rather, the second hearing device receives the other audio packet and it transmits an ACK packet to the wireless communication device in response to successfully receiving the audio packet shown by the bold line with an arrow. The secondary hearing device can determine that it needs to transmit an ACK packet based on a notification from the first hearing device that it missed the audio packet, based on timing, or based on sequence information that indicates the first hearing device may have missed the audio packet. The wireless communication device can continue to transmit audio packets and the hearing devices can continue to receive and transmit ACK packets.

In the middle of FIG. 4A, the first hearing device transmits a signaling packet to the wireless communication device. Here, a suspend diversity operation can be implemented. The signaling packet is of type DM1 and is noted as <ACK; 1; LMP>, and the "X" indicates that it was not successfully received by the wireless communication device. Accordingly, the first hearing device needs to transmit the signaling packet again so that the wireless communication device receives it successfully. The first hearing device can continue to send the signaling packet until the wireless communication device acknowledges that it has successfully received it.

As indicated by dashed-line box 405, the second hearing device suspends diversity, which means it does not transmit an ACK packet even if it successfully receives an audio packet. The dashed-line box 405 can also be referred to as a suspend diversity window. In some implementations, the suspend diversity window can begin before the first hearing device determines it needs to send a signaling packet. Alternatively, the suspend diversity window can begin when the first hearing device transmits its signaling packet and begins waiting for an ACK from the wireless communication device. The suspend diversity window can last until the first hearing device successfully receives an acknowledgment that its signaling packet was successfully received by the wireless communication device.

In contrast to FIG. 4A, where a first hearing device transmitted a signaling packet and waited for confirmation, FIG. 4B illustrates diversity suspension when a wireless communication device transmits a signaling packet. Starting from the left of FIG. 4B, a wireless communication device transmits an audio packet <NAK, 0, Audio 1>, where NAK means negative acknowledgment, either because the last reception attempt failed or an empty packet was received, 0 refers to the SEQN number, and Audio 1 refers to the payload. The first hearing device successfully receives the Audio 1 audio packet (as shown by the bold arrow), but the second hearing device does not receive it. In such a case, the first hearing device can forward the Audio 1 packet to the second hearing device. The first hearing device can acknowledge the successful reception of the Audio 1 packet by transmitting an ACK packet <ACK, 0> of type NULL, which contains only a positive acknowledgment for the wireless communication device.

After Audio 2 audio packet is successfully received and acknowledged, the wireless communication device transmits a signaling packet <NAK, 0, LMP>. Here, the suspend diversity scheme operates such that the second hearing device is configured to never acknowledge correctly received signaling packets (e.g., LMP packets or L2CAP packets that do not contain A2DP audio). This policy ensures that there is no complex binaural forwarding of signaling packets from the second hearing device to the first hearing device. It also reduces traffic of signaling packets. Accordingly, as shown in FIG. 4B, there is an "X" over the ACK packet that the second hearing device would transmit in response to successfully receiving the signaling packet. Then, as shown in FIG. 4B, the wireless communication device transmits the signaling packet again (because there was no acknowledgment), and on this attempt, the first hearing device successfully receives it and transmits an acknowledgment. After the wireless communication device determines that its signaling packet was successfully acknowledged, it can again transmit audio packets as shown by Audio 3 audio packet in FIG. 4B. More generally, FIG. 4B illustrates that the wireless communication device can also send signaling packets and just before or when the signaling packet is transmitted, the secondary hearing device can suspend its diversity so that it does not transmit acknowledgment packets in response to receiving the signaling packets.

Although not shown in FIG. 3, 4A, or 4B, the wireless communication device or the hearing device transmits audio packets or signaling packets. These packets can include a channel identification (CID), which can be a two-bit number. The CID can be used by the wireless communication device 102 or hearing device 103 to determine what type of information the packet is associated with (e.g., CID can be associated with a hands-free profile and another CID can be associated with a A2DP). In some implementations, the hearing device or wireless communication device can use CID to implement full diversity. For example, the hearing device may implement full diversity for packets with a CID related to A2DP, but the hearing device may not implement full diversity for packets with a CID associated with the hands-free profile (or another profile). If the device determines that a CID is associated with A2DP, it can then distinguish between packets related to audio and packets related to signaling.

Figure 5:
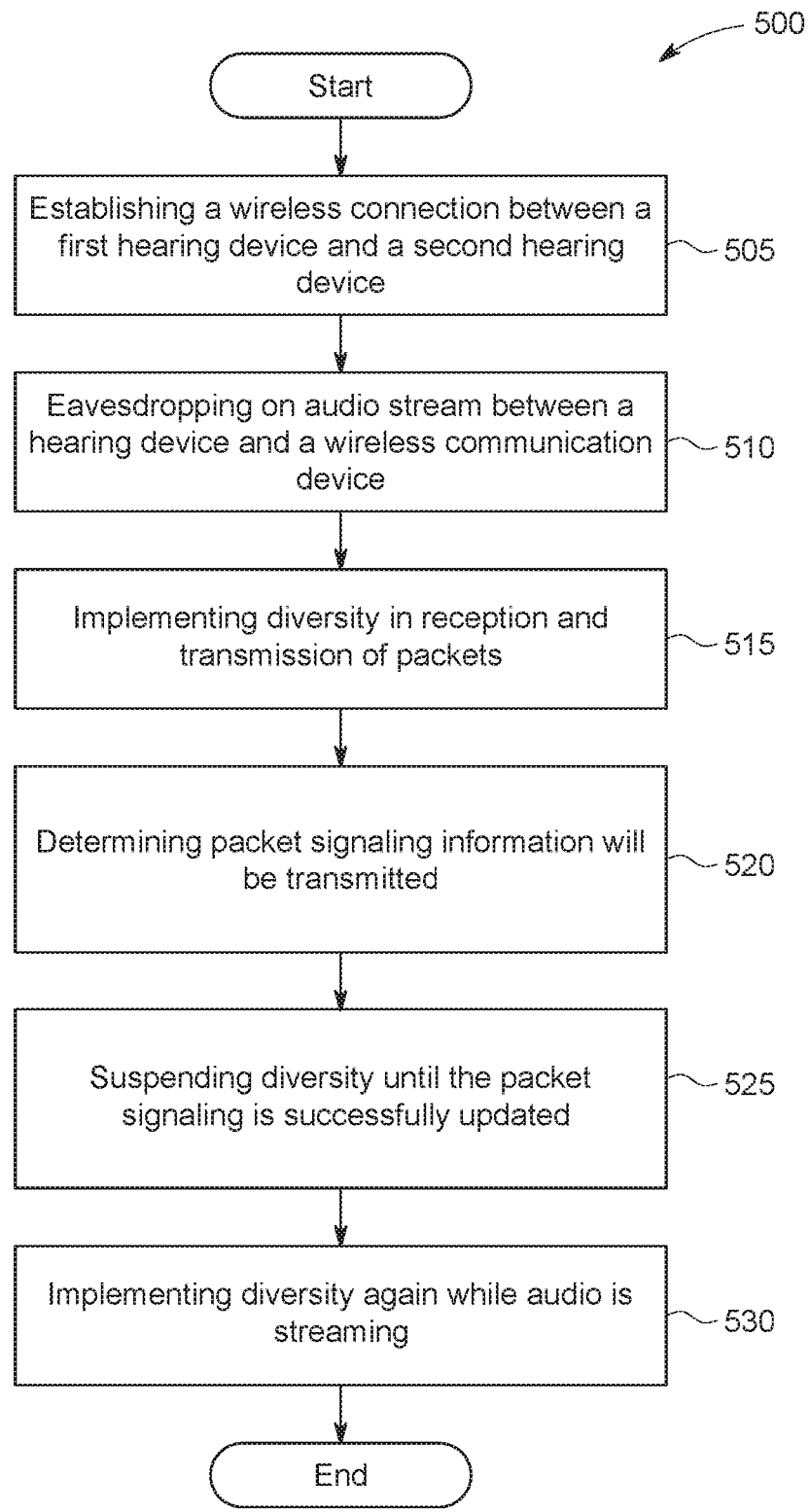
FIG. 5 is a process block flow diagram that illustrates a process 500 for implementing diversity suspension in accordance with some implementations of the disclosed technology.

FIG. 5 illustrates a block flow diagram for a process 500 for implementing a diversity scheme and suspension of diversity. In some implementations, the process 500 is carried out by a hearing device (e.g., hearing device 103, FIG. 1) or carried out by a wireless communication device (e.g., wireless communication device 102, FIG. 1). Part or all of the process 500 may be carried out on more than one device (e.g., two hearing devices perform the process or a wireless communication and two hearing devices perform the operations of the process 500). The process 500 begins with a wireless connection operation 505 and continues to eavesdropping operation 510. As disclosed in more detail, some operations of the process 500 may be repeated or performed out of order.

At wireless connection operation 505, a hearing device wireless connects with a wireless communication device and the hearing device also wireless connects with another hearing device. The hearing device can wireless connect with a wireless communication device using a Bluetooth link or another wireless communication protocol. The hearing device can also perform pairing and authentication operations to secure the wireless connection between the hearing device and the wireless communication device. The hearing device with the wireless connection to the wireless communication device can be referred to as the "primary" device, the "master device", or the "first" hearing device. The other hearing device can be referred to as the "secondary", "slave", or "second" hearing device. The wireless connection between the hearing device can be a binaural connection, which means the two hearing devices can communicate regarding providing hearing to the hearing device user. The wireless protocol used to connect the hearing device and the wireless communication device can be different than the wireless protocol used to connect the two hearing devices. More information regarding the wireless connection between the wireless communication device and the hearing devices can be found in PCT/EP2018/081139 filed Nov. 14, 2018, and titled "Operating More Than One Wireless Communication Protocol with a Coexistence Window," and PCT/EP2018/081136 filed on Nov. 14, 2018, and titled "Operating More Than One Wireless Protocol with a Hearing Device," both of which are incorporated herein by reference for their entireties.

At eavesdropping operation 510, a second hearing device (e.g., a slave or secondary hearing device) eavesdrops an audio stream between the first hearing device and the wireless communication device. Specifically, a wireless communication device can transmit a stereo audio stream of music or phone call audio using A2DP, and the second hearing device can eavesdrop audio packets and/or signaling packet information from the audio stream. If the second hearing device is a left hearing device, it can eavesdrop left audio packet information; and if the second hearing device is a right hearing device, it can eavesdrop right audio packet information. The eavesdropping operation can also be referred to as "sniffing" or "spoofing", but it is more accurate to refer to it as eavesdropping because a user intends that the second hearing device receive the audio information for the stream.

At diversity operation 515, two hearing devices implement a diversity scheme. In a diversity scheme, the hearing devices communicate and work together to receive and transmit information that increases (e.g., maximizes) the probability that the wireless communication device (e.g., audio source such as a smartphone) receives an ACK packet. Specifically, if both hearing devices successfully receive an audio packet, either hearing devices (e.g., first or second, primary or secondary) can transmit an ACK packet to the wireless communication device to acknowledge receipt of the audio packet. If only the first hearing device (e.g., primary hearing device or master hearing device) successfully receives an audio packet, the primary hearing device can forward the audio packet to the second hearing device (e.g., secondary device) and the first hearing device can transmit an ACK packet to the wireless communication device. If only the second hearing device successfully receives an audio packet, the secondary hearing device can forward the audio packet to the first hearing device (e.g., primary device) and the secondary hearing device can transmit an ACK packet to the wireless communication device.

In some implementations, the wireless communication device can continue to transmit audio stream using A2DP to the first hearing device while the second hearing device eavesdrops. However, during an audio stream it is necessary to exchange both audio packet information (e.g., payloads) and signaling information. The signaling information is generally bidirectional, and thus the wireless communication device or the first hearing device may need to receive or to transmit signaling information to successfully transmit or receive or use the audio stream. Also, in general, the secondary hearing device does not exchange signaling information directly with the wireless communication device (e.g., because it is eavesdropping).

At packet signaling operation 520, the wireless communication device determines that it will send a signaling packet or the first hearing device determines it will send a signaling packet. FIG. 4A illustrates a first hearing device sending a signaling packet and FIG. 4B illustrates a wireless communication device transmitting a signaling packet. The signaling packet can be related LMP communication or L2CAP communication. When the first hearing device receives the signaling back, it can communicate to the second hearing device that it has received the signaling packet.

At suspend diversity operation 525, the second hearing device suspends diversity until the primary hearing device successfully transmits a signaling packet to the wireless communication device or the wireless communication device successfully transmits a signaling packet to the first hearing device. Based on the packet signaling operation 520, the first hearing device can determine that signaling packets are being sent from the wireless communication device to the first hearing device or that the first hearing device needs transmit a signaling packet. It is at this time that the second hearing device suspends transmitting acknowledgment packets to successfully received audio packet and successfully received signaling packets from the wireless communication device. Normally, when a diversity scheme is implemented either the first or the second hearing device transmits acknowledgment packets; however, when the diversity scheme is suspended (e.g., at least partially), it means the second hearing device does not transmit acknowledgment packets until the first hearing device has received an acknowledgment that its signaling packet was successfully received or the wireless communication device receives an acknowledgment that its signaling packet was successfully received.

At continue diversity operation 530, the hearing devices and the wireless communication continue to implement a diversity scheme as normal (see FIGS. 1A, 1B, and 1C). Specifically, the suspension of diversity from operation 525 is stopped (e.g., the diversity scheme is implemented in full). The hearing devices and wireless communication device can continue in operation 530 until the next signaling packet needs to be transmitted or is transmitted.

Aspects and implementations of the process 500 of the disclosure have been disclosed in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. The steps or operations may be performed by a combination of hardware, software, and/or firmware such with a wireless communication device or a hearing device. For example, the operations 520, 525, and 530 can be repeated each time that a signaling packet is transmitted and/or received, and it may not be necessary to perform operations 505, 510, and 515 again. In some implementations, the process 500 can run continuously and/or automatically based on the hearing device turning on or streaming audio information.

The phrases "in some implementations," "according to some implementations," "in the implementations shown," "in other implementations," and generally mean a feature, structure, or characteristic following the phrase is included in at least one implementation of the disclosure, and may be included in more than one implementation. In addition, such phrases do not necessarily refer to the same implementations or different implementations.

The techniques introduced here can be embodied as special-purpose hardware (e.g., circuitry), as programmable circuitry appropriately programmed with software or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory excludes a propagating signal.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in an order, alternative implementations may perform routines having steps, or employ systems having blocks, in a different order, and some processes or blocks may be deleted, moved, added, subdivided, combined, or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. As another example, "A or B" can be only A, only B, or A and B.

I claim:

1. A method for operating two hearing devices, the method comprising:
    establishing, via a first hearing device, a first wireless connection with a second hearing device;
    establishing, via the first hearing device, a second wireless connection with a wireless communication device;
    eavesdropping, via the second hearing device, a stream from the wireless communication device to the first hearing device;
    determining that the first hearing device is waiting for an acknowledgement of a signaling packet, transmitted by the first hearing device, from the wireless communication device;
    suspending, at the second hearing device, transmission of acknowledgements while the first hearing device is waiting for the acknowledgement of the signaling packet; and
    determining that the first hearing device has successfully received the acknowledgement of the signaling packet from the wireless communication device,
    wherein the stream includes a channel identification (CID), and wherein the CID is associated with A2DP or a profile, and wherein the first hearing device or the second hearing device use the CID to implement diversity.

2. The method of claim 1, the method further comprising:
    updating, at the second hearing device, a sequence number associated with packet headers transmitted from the second hearing device.

3. The method of claim 1, wherein determining that the first hearing device is waiting for an acknowledgement of the signaling packet from the wireless communication device further comprises:
    receiving an indication from the first hearing device that enables the second hearing device to determine the first hearing device is waiting for an acknowledgment of the signaling packet; or
    based on timing information, determining that the first hearing device is expecting to receive the acknowledgment.

4. The method of claim 1, wherein the first hearing device is a primary hearing device and the second hearing device is a secondary hearing device.

5. The method of claim 1, wherein the first and second wireless connection use different wireless communication protocols.

6. The method of claim 1, the method further comprising:
    suspending, at the second hearing device, transmission of acknowledgements for a period of time before the first hearing device is waiting for the acknowledgement of the signaling packet,
    wherein the period of time is based on receiving a notification from the first hearing device that it anticipates transmitting the signaling packet.

7. The method of claim 1, wherein a communication protocol used in the second wireless connection is associated with BLUETOOTH and a communication protocol used in the first wireless connection is a proprietary wireless communication protocol.

8. The method of claim 1, wherein the first and second hearing device uses the same sequence number when transmitting an acknowledgement.

9. The method of claim 1, wherein the stream is associated with stereo audio and an Advanced Audio Distribution Profile (A2DP).

10. The method of claim 9, wherein the stream is associated with A2DP audio packets addressed to the CID, wherein the CID is configured as a destination channel endpoint for the A2DP profile.

11. The method of claim 1, wherein the signaling packet refers to a Link Management Protocol (LMP) data unit or wherein the signaling packet refers to a Logical Link Control and Adaptation Protocol (L2CAP) data unit addressed to a CID different than a destination channel endpoint for A2DP.

12. The method of claim 1, the method further comprising:
    determining that the wireless communication plans to transmit a signaling packet; and
    suspending, at the second hearing device, transmission of acknowledgements until the signaling packet from the wireless communication device is successfully received.

13. A non-transitory computer readable medium storing instructions, which when executed by a processor or processors cause hearing devices to perform operations, the operations comprising:
- establishing, via a first hearing device, a first wireless connection with a second hearing device;
- establishing, via the first hearing device, a second wireless connection with a wireless communication device;
- eavesdropping, via the second hearing device, a stream from the wireless communication device to the first hearing device;
- determining that the first hearing device is waiting for an acknowledgement of a signaling packet, transmitted by the first hearing device, from the wireless communication device;
- suspending, at the second hearing device, transmission of acknowledgements while the first hearing device is waiting for the acknowledgement of the signaling packet; and
- determining that the first hearing device has successfully received the acknowledgement of the signaling packet from the wireless communication device,
- wherein the stream includes a channel identification (CID), and wherein the CID is associated with A2DP or a profile, and wherein the first hearing device or the second hearing device use the CID to implement diversity.

14. The non-transitory computer readable medium of claim 13, the operations further comprising:
- updating, at the second hearing device, a sequence number associated with packet headers transmitted from the first and second hearing device.

15. The non-transitory computer readable medium of claim 13, wherein determining that the first hearing device is waiting for an acknowledgement of the signaling packet from the wireless communication device further comprises:
- receiving an indication from the second hearing device that enables the first hearing device to determine the first hearing device is waiting for an acknowledgment of the signaling packet; or
- based on timing information, determining that the first hearing device is expecting to receive the acknowledgment.

16. The non-transitory computer readable medium of claim 13, the first hearing device is a primary hearing device or master hearing device and the second hearing device is a secondary hearing device or slave device.

17. The non-transitory computer readable medium of claim 13, wherein the first and second wireless connection are based on different wireless communication protocols.

18. The non-transitory computer readable medium of claim 13, the operations further comprise:
- suspending, at the second hearing device, transmission of acknowledgements associated with received audio packets a period of time before the first hearing device is waiting for the acknowledgement of the signaling packet, wherein the period of time is based on receiving a notification from the first hearing device that it anticipates transmitting a signaling packet or receiving the acknowledgment that the signaling packet was successfully received.

19. A method for operating a hearing device, the method comprising:
- establishing, via a first hearing device, a wireless connection with a second hearing device;
- establishing, via the first hearing device, a second wireless connection with a wireless communication device;
- activating, at the first and second hearing devices, a diversity scheme,
  - wherein the diversity scheme includes controlling transmission of acknowledgment packets and forwarding audio packets between the first and second hearing devices based on successfully received audio packets or successfully received signaling packets;
- eavesdropping, via the second hearing device, a stream from the wireless communication device to first hearing device;
- suspending the diversity scheme for the second hearing device while the first hearing device is waiting for acknowledgement of a signaling packet; and
- determining that the first hearing device has received acknowledgement of the signaling packet from the wireless communication device,
- wherein the stream includes a channel identification (CID), and wherein the CID is associated with A2DP or a profile, and wherein the first hearing device or the second hearing device use the CID to implement diversity.

20. The method of claim 19, the method further comprising:
- updating, at the first hearing device, a sequence number associated with acknowledgments associated with receiving audio packets from the wireless communication device.

21. A hearing device, the hearing device comprising:
- an antenna configured to operate in a range of 2-3 GHz;
- a transceiver electronically coupled to the antenna;
- a processor configured to control the transceiver to transmit and receive audio packets and signaling packets, wherein the processor is further configured to cause the hearing device to eavesdrop a stream between a wireless communication device and another hearing device, wherein the stream includes a channel identification (CID), and wherein the CID is associated with A2DP or a profile, and wherein the first hearing device or the second hearing device use the CID to implement diversity;
- a diversifier configured to diversify transmission and reception packets based on communications with another hearing device;
- a diversifier suspender configured to prevent transmission of acknowledgment packets; and
- a transducer configured to provide audio information to a hearing device user.

22. The hearing device of claim 21, the hearing device comprising:
- a microphone and a battery.

* * * * *